US011250322B2

(12) United States Patent
Carrasco et al.

(10) Patent No.: US 11,250,322 B2
(45) Date of Patent: Feb. 15, 2022

(54) SELF-HEALING MACHINE LEARNING SYSTEM FOR TRANSFORMED DATA

(71) Applicant: Sony Interactive Entertainment LLC, San Mateo, CA (US)

(72) Inventors: Serge-Paul Carrasco, San Mateo, CA (US); Cen Zhao, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 113 days.

(21) Appl. No.: 16/512,119

(22) Filed: Jul. 15, 2019

(65) Prior Publication Data
US 2021/0019612 A1    Jan. 21, 2021

(51) Int. Cl.
*G06N 3/08* (2006.01)
*G06N 3/04* (2006.01)
*G06N 5/00* (2006.01)

(52) U.S. Cl.
CPC .............. *G06N 3/08* (2013.01); *G06N 3/0427* (2013.01); *G06N 3/0445* (2013.01); *G06N 5/003* (2013.01)

(58) Field of Classification Search
CPC ...... G06N 3/08; G06N 3/0427; G06N 3/0445; G06N 5/003; G06N 20/10; G06N 3/0454; A63F 13/00; A63F 13/35; A63F 13/358; A63F 13/422
See application file for complete search history.

(56) References Cited

U.S. PATENT DOCUMENTS

| 6,493,686 | B1 | 12/2002 | Francone et al. |
| 6,601,233 | B1 | 7/2003 | Underwood |
| 6,615,166 | B1 | 9/2003 | Guheen et al. |
| 2005/0065753 | A1 | 3/2005 | Bigus et al. |
| 2006/0059253 | A1 | 3/2006 | Goodman et al. |
| 2014/0377727 | A1 | 12/2014 | Yom-Tov et al. |
| 2015/0379429 | A1 | 12/2015 | Lee et al. |
| 2017/0330109 | A1* | 11/2017 | Maughan ................. G06N 5/04 |

(Continued)

FOREIGN PATENT DOCUMENTS

| CN | 107870902 A | 4/2018 |
| CN | 108460489 A | 8/2018 |
| TW | 201812646 A | 4/2018 |

OTHER PUBLICATIONS

International Search Report and Written Opinion dated Oct. 16, 2020 from the counterpart PCT application PCT/US20/38965.

(Continued)

*Primary Examiner* — Abdullah Al Kawsar
*Assistant Examiner* — Brent Johnston Hoover
(74) *Attorney, Agent, or Firm* — John L. Rogitz

(57) ABSTRACT

An end-to-end cloud-based machine learning platform providing personalized game player experiences. Data lineage is generated for all transformed data for generating feature ETLs, and for training machine learning models. That data is used to understand the performance of off-line and online recommender systems for the personalization of the game player experiences. To that end, the platform pipeline provides the life cycle of the transformed data to a self-healing system that compare it to the life cycle of the user interactions. By comparing the two life cycles, the self-healing system can automatically provide a diagnostic, and it can also automatically provide an action if the performance of the model predictions has changed over time.

17 Claims, 11 Drawing Sheets

(56) References Cited

U.S. PATENT DOCUMENTS

| | | |
|---|---|---|
| 2018/0351981 A1 | 12/2018 | Muddu et al. |
| 2019/0025773 A1 | 1/2019 | Yang et al. |
| 2020/0034435 A1* | 1/2020 | Norouzi .............. G06N 3/0445 |
| 2020/0366699 A1* | 11/2020 | Sampaio ................ G06N 20/00 |

OTHER PUBLICATIONS

Psaier et al., "A Survey on Self-Healing Systems: Approaches and Systems", In: Computing, Aug. 5, 2010, retrieved from Springer.
Hochreiter et al., "Long Short-Term Memory", Neural Computation 9(8): 1735-1780, 1997.
Mnih et al., "Playing Atari with Deep Reinforcement Learning", DeepMind Technologies, Dec. 2013.
Salimans et al., "Evolution Strategies as a Scalable Alternative to Reinforcement Learning", OpenAI, Sep. 2017.
International Search Report and Written Opinion dated Sep. 24, 2020 from the counterpart PCT application PCT/US20/38190.

* cited by examiner

SELF-HEALING MACHINE LEARNING SYSTEM FOR TRANSFORMED DATA

FIELD

The application relates generally to technically inventive, non-routine solutions that are necessarily rooted in computer technology and that produce concrete technical improvements. In particular, the present application relates to end-to-end cloud-based machine learning platforms providing personalized game player predictions.

BACKGROUND

Machine learning can be classified into different tasks such as supervised learning, unsupervised learning, deep learning, reinforcement learning, and recommender systems, that can be used for a wide variety of computer applications such as online personalized recommendations, computer vision, speech recognition, Internet search engines, personal assistant, and self-driving cars.

As understood herein, machine learning is particularly suited in the context of computer simulations such as computer games, in which game developers constantly innovate by "re-imagining" how people play games and game players have ever changing behaviors regarding how they interact, consume, and purchase games.

SUMMARY

Present principles relate to the detection and remediation of underlying causes that can contribute to changes of off-line or online predictions of a machine learning model, particularly in making predictions related to personalized experiences in computer simulations such as computer games. The models described herein in example embodiments learns how to provide personalized game experiences such as a recommendation of a game to a given user, recommendation of a tip to a user to better play, or recommendation of a game activity to a user. The machine learning pipeline generates data lineage for the features and the models. The behavior of the game player can change at any time. This might cause a change in the performance of the model predictions. The "self-healing" system described below detects those changes and provides remediation to those changes so that the player experience is still personalized even if his behavior is changing.

Present principles address one or more of the above challenges.

Accordingly, in one aspect an apparatus includes at least one processor and at least one computer storage that is not a transitory signal and that in turn includes instructions executable by the processor to execute a decision tree model or a sequence model having access to historical raw data, model features, feature meta-data, and model metadata to identify changes in behaviors of users of computer games and changes in predictions of models to recommend to users. The decision tree model does this at least in part by determining, for at least a first prediction model, whether a change is associated with a model quality metric associated with the first prediction model. Responsive to determining that a change is associated with the model quality metric associated with the first prediction model, the instructions are executable for generating a signal to cause the decision tree model to dive deeper into causes of the change using feature distribution statistics. On the other hand, responsive to determining that a change is not associated with the model quality metric associated with the first prediction model, the instructions are executable for generating a signal determining whether a ranking of features by importance has changed.

Furthermore, the instructions are executable for causing the decision tree model to, responsive to determining that the ranking of features by importance has changed, determine whether statistics regarding a distribution of features have changed, and responsive to determining that statistics regarding a distribution of features have changed, generate a signal indicating that user behaviors might have changed. In contrast, responsive to determining that statistics regarding a distribution of features have not changed, a healthy system is indicated. Also, responsive to determining that the ranking of features by importance has not changed, a healthy system is indicated.

In example embodiments, the instructions can be executable to identify that an attribute of a data set for generating an indicia of model features has changed and in response automatically backfill data into the indicia of model features to compensate for processing a delay in the machine learning pipeline. The instructions may be executable to identify that an attribute of a data set for generating the indicia of model features has not changed and in response re-train the first prediction model.

In some implementations the sequence model alluded to above may include a deep learning system, raw data distribution statistics for input to the deep learning system, feature data including feature data distribution statistics, importance of respective features in the model, and status of feature deployment for input to the deep learning system, and monitoring data including computer component usage, requests processed, and temporal characteristics of machine learning jobs for input to the deep learning system. Also, the sequence model can include model data including model performance metrics measures and model meta-data metrics for input to the deep learning system. The deep learning system outputs recommendations of self-healing actions for the machine learning pipeline.

In example embodiments, the deep learning system of the sequence model can include at least a first layer of long short-term memory (LSTM) units for monitoring raw data, feature data, and pipeline data from a data lineage infrastructure. The sequence model may also include at least a second layer of LSTM units for monitoring model data, and at least a third layer of LSTM units for monitoring the two previous layers for an attention layer. The attention layer enables the deep learning system to learn where to pay "attention", and it can learn how to do so, by adjusting the weights it assigns to its various inputs. A softmax classifier receives input from the attention layer and outputs respective probabilities for plural actions.

In non-limiting examples, at least a first one of the probabilities is given by:

$$S(y_i^{(t)}) = \frac{e^{y_i(t)}}{\sum_j e^{y_i(t)}}$$

And, assuming $\alpha^{<t,t'>}$ is the amount of attention that the input to the classifier $y_i^{<t>}$ should pay to the activation $a^{<t'>}$ and $c^{<t>}$ at time t of the previous LSTM monitoring layer as determined by:

$$c^{\langle t \rangle} =$$

We have $\alpha^{\langle t,t' \rangle} = \dfrac{e^{\langle t,t' \rangle}}{\sum\limits_{t''=1}^{Tx} e^{\langle t,t' \rangle}}$ with $\sum\limits_{t'} \alpha^{\langle t,t' \rangle} = 1$ The sequence model may be executed off-line, in which case inputs to the sequence model may include daily model performance metric, model meta-data metrics, daily feature distribution statistics, daily raw data distribution, and pipeline monitoring data. When off-line, the sequence model may output a highest probability generated by the softmax classifier of one or more of no action, automatically retrain at least one model, develop at least one new model, create at least one new feature, add data, and indicate change in user behavior.

Furthermore, the sequence model may be executed online, in which case inputs to the sequence model may include one or more of hourly model performance metrics, online model meta-data metrics, feature deployment status indicating that all features are available to the model, and online feature meta-data metrics. When online, the sequence model may output a highest probability generated by the softmax classifier of one or more of no action, re-deploy a default model, request a change to model features, and indicate change in user behavior.

In another aspect, a computer system is configured to execute a computerized sequence model that includes a deep learning system. Raw data distribution statistics can be input to the deep learning system along with feature data including feature data distribution statistics, importance of respective features in the model, and status of feature deployment for input to the deep learning system. Also, monitoring data including computer component usage, requests processed, and temporal characteristics of machine learning jobs can be input to the deep learning system. Moreover, model data including model performance metrics measures and model meta-data metrics can be input to the deep learning system. The deep learning system outputs recommendations of self-healing actions for the machine learning pipeline.

In another aspect, an apparatus includes at least one processor and at least one computer storage that is not a transitory signal and that in turn includes instructions executable by the processor to track user interactions with at least one computer simulation to generate features. The instructions can be executed to track the features and versions, time context, metrics, and relationships with models of the features, track at least one ancestry line responsible for generating the features, and using output of tracking user interactions, features, and ancestry line, combine life cycle of user features and user interactions to output at least one recommendation of a self-healing action for the machine learning pipeline.

The details of the present application, both as to its structure and operation, can best be understood in reference to the accompanying drawings, in which like reference numerals refer to like parts, and in which:

DETAILED DESCRIPTION

Figure 1:
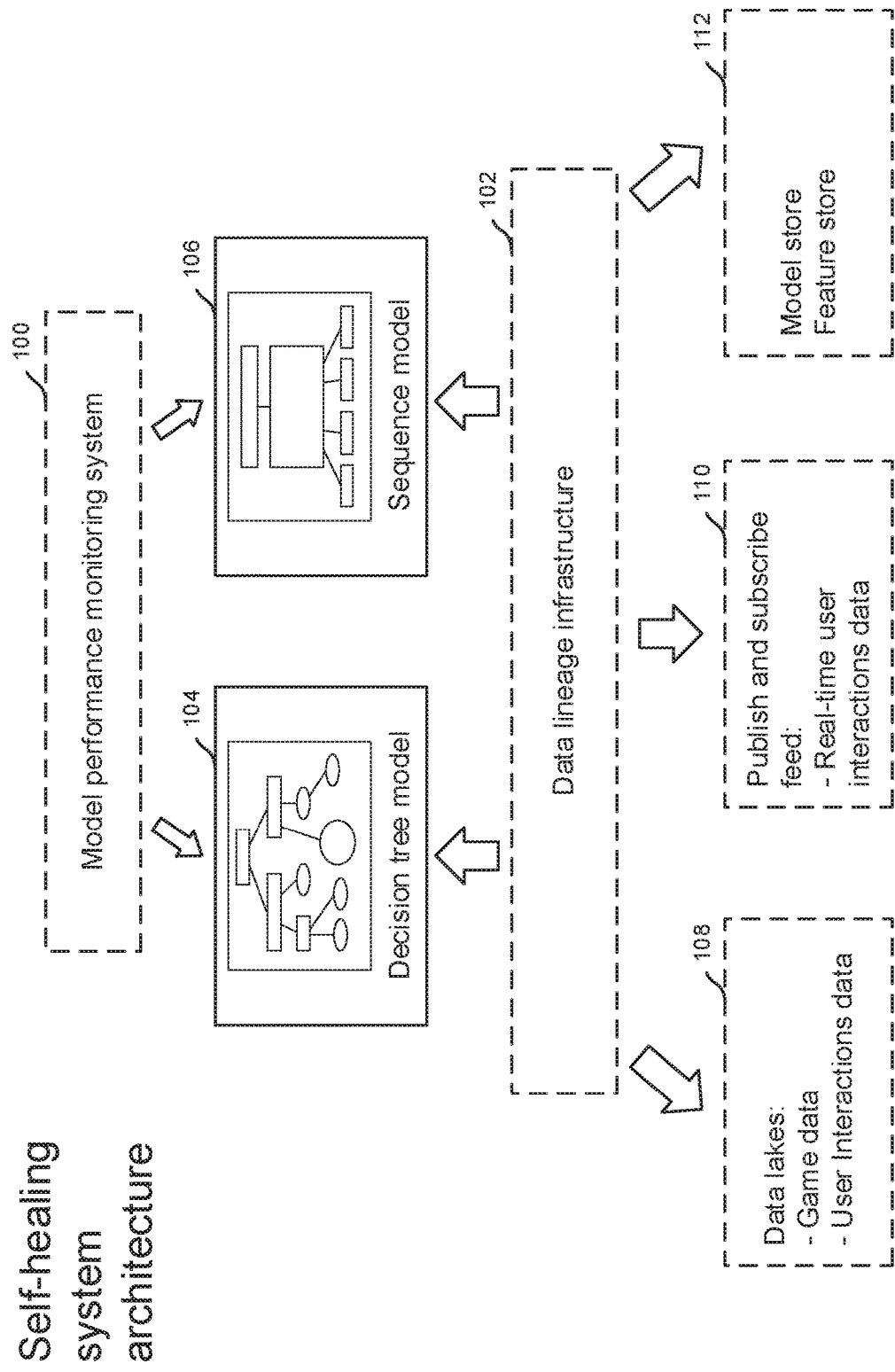
FIG. 1 is a block diagram of an example architecture of the self-healing system including its model performance monitoring system, its data lineage infrastructure, its decision tree model, and its sequence model.

This disclosure relates generally to computer ecosystems including aspects of consumer electronics (CE) device networks such as but not limited to distributed computer game networks, augmented reality (AR) networks, virtual reality (VR) networks, video broadcasting, content delivery networks, virtual machines, machine learning, and artificial neural networks applications.

A system herein may include server and client components, connected over a network such that data may be exchanged between the client and server components. The client components may include one or more computing devices including AR headsets, VR headsets, game consoles such as Sony PlayStation® and related motherboards, game controllers, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Orbis or Linux operating systems, operating systems from Microsoft, or a Unix operating system, or operating systems produced by Apple, Inc. or Google. These operating environments may be used to execute one or more programs/applications, such as a browser made by Microsoft or Google or Mozilla or other browser program that can access websites hosted by the Internet servers discussed below. Also, an operating environment according to present principles may be used to execute one or more computer game programs/applications and other programs/applications that undertake present principles.

Servers and/or gateways may include one or more processors executing instructions that configure the servers to receive and transmit data over a network such as the Internet Additionally, or alternatively, a client and server can be connected over a local intranet or a virtual private network. A server or controller may be instantiated by a game console and/or one or more motherboards thereof such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or video game website to network users to communicate crowdsourced in accordance with present principles.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

As indicated above, present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below may be implemented in hardware circuitry or software circuitry. When implemented in software, the functions and methods can be written in an appropriate language such as but not limited to Python, Scala, Java, C# or C++ and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

In general, present principles understand that the development of machine learning models requires multiple workflows. Machine learning models need first to be trained in order to provide their predictions to an application. Model training involves the selection of the model features, and a machine learning algorithm.

Features are generated through ETL (extract transform and load) services. The goal of the ETL is to extract relevant data from the initial raw data set. In supervised learning such as regression and classification of data sets, model training requires locating the model parameters or weights by finding the minimum of the difference between the label data or output data of the training sets and the model predictions. That difference is called a cost or loss function, and the algorithm to find that minimum is called gradient descent. Gradient descent algorithms such as batch, stochastic, and mini batch may be used.

On the other hand, in unsupervised learning such as clustering of data sets, there is no label data. The training of the model aims to find patterns into the data. While the model parameters are generated by algorithms, model training requires a number of hyperparameters that need to be tuned by the modeler. A "model parameter" is normally an internal variable, coefficient, or weight that is optimized by the learning algorithm such as gradient descent. Examples of model parameters include the weight vector coefficients in a linear regression, logistic regression, and support vector machines, the split points in a decision tree. In contrast, "hyperparameters" are normally set by the modeler or tuned via algorithmic methods to optimize the performance of the model. Examples of hyperparameters include the number of neighbors k in the k-nearest neighbor algorithm, the depth of the tree in decision trees, the learning rate in a neural network, or the number of filters learned in a given convolutional layer in a convolutional neural network.

When the model has been trained, e.g. the model parameters have been found, and the model has been validated, e.g. the model hyperparameters have been tuned, the model can be tested. Testing the model requires understanding how the model performs on instances it has never seen before in order to avoid overfitting or underfitting. In case the model overfits, the model performs well on the training data, but it does not generalize well. In case the model underfits, the model is too simple to learn the underlying structure of the data sets.

As understood herein, machine learning pipelines can be used to automate the machine learning workflows from end-to-end by leveraging large scale data processing infrastructure to facilitate, in an automated way, the generation of feature ETLs from raw data, the data transformation of features into model predictions, and the deployment of trained models for inference in a production environment. Data pipelines empower modelers to move faster from generating their feature ETLs to monitoring their model predictions into a production environment. When the model has been trained, validated, and tested, it can be deployed in a production environment to provide its recommendations to applications.

While in production, the model performance must be monitored. For a standard algorithm, such as a regression or a classification, standard metrics can be used to monitor the model performance such as the root mean squared error for a regression or precision, recall, and F1 score for a classification.

Present principles are directed to the following recognitions in the context of machine learning models for providing personalized player experiences. Game items such as digital games, digital content, game mobile applications, game videos frequently change as game developers innovate by re-imagining how people play games. And, game players have ever changing behaviors regarding how they interact, consume, and purchase games. As understood herein, in that context, even if the model has been properly trained, validated, and tested, model performances for personalizing game experiences might change at any time. Modelers do not have any methodologies to articulate why the model performance. As a result, new features ETLs for game users and game items need to be generated and personalization models need to be re-trained, validated, and tested.

Currently, absent principles set forth herein this challenge is unaddressed. In general, the selection of the right features has a larger impact on the quality of the model predictions than the model algorithm itself. While different types of algorithms might produce slightly better model predictions, this is not the case for features and without a mechanism to correlate the changes in the raw data inputs for generating feature ETLs, the changes in the data transformation for generating the model features, and training the models, with model performance itself subject to change at any time, there was no means prior to present principles to assess the root cause of the model performance changes in inference. As understood herein, more than one parameter must be monitored. For instance, monitoring the feature or the model only entails lengthy time to discover root causes of non-performing models, while monitoring the data pipeline only fails to foresee changes in the raw game player and/or game item data. Present principles accordingly facilitate debugging and improving the end-to-end model performance.

A self-healing system is described herein to monitor the model predictions, identify the possible root causes of unhealthy data transformations, and propose remedial actions. The self-healing system correlates the life cycles of all transformed data involved in all types of data transformations. Raw data to generate features, features to generate models, model predictions, and data pipelines are all analyzed together. Leveraging that historical data, possible root causes are detected for model performance changes, and adequate actions to solve the issue are proposed by the models of the self-healing system.

As shown in FIG. 1, a system consistent with present principles has four components. A model performance and monitoring system 100 keep tracks of any changes in the quality of the model predictions. The model performance and monitoring system 100 may decide whether to employ the below-described decision tree model or the below-described sequence model. If the system has less than a threshold amount of historical data, e.g., less than 18 months, the self-healing system requests the decision tree model. On the other hand, if the system has more than the threshold amount of historical data, the self-healing system requests the sequence model.

A data lineage infrastructure 102 for features and models compares the life cycle of transformed data (e.g., generated features and model predictions), with the life cycle of the game player interactions with the game items. Both the monitoring system 100 and data lineage infrastructure 102 provide input to a decision tree model 104 operating on a relatively small historical data set to determine a course of remedial actions for off-line model predictions. Furthermore, the monitoring system 100 and data lineage infrastructure 102 provide input to a sequence model 106, for a relatively large historical data set, that uses an attention mechanism that determines the course of remedial actions both for off-line and online model predictions.

The monitoring system 100 consistently tracks any significant change to a model quality metric referred to herein as model WPAE, measured by a threshold and set-up by the administrator of the self-healing system. Details of the "WPAE" metric are set forth in the present assignee's U.S. patent application Ser. No. 16/424,193, incorporated herein by reference. In contrast, the data lineage infrastructure 102 consistently tracks the data, their versions, the time context, and the metrics associated with any data transformation that occurs in the machine learning pipeline. The data lineage infrastructure 102 also consistently tracks the interaction changes of the game player to the game items and the game player to other game players. By analyzing the data from the data lineage infrastructure, the decision tree model 104 can diagnose when the offline model prediction has changed, and the cause that produced that change. As a result, it can predict the right action for the right cause such as generating new feature ETLs, re-training the model, redesigning the model, or alerting about game player behavioral changes.

Similarly, by analyzing the data from the data lineage infrastructure 102, the sequence model 106 can diagnose when the off-line or online model prediction has changed, and the cause that produced that change. As a result, it can also predict the right action for the right cause such as generating new feature ETLs, re-training the model, redesigning the model, or alerting about game player behavioral changes.

FIG. 1 further illustrates that the data lineage infrastructure 102 accesses one or more data stores 108 (referred to as "lakes" in FIG. 1) containing game data and historical user interaction data. On the other hand, real time user interaction data may be accessed by the data lineage infrastructure 102 from one or more publish and subscribe feed sources 110. Further, the data lineage infrastructure 102 accesses a feature store and model store data structure 112 of the machine learning pipeline described below. Each block in FIG. 1 (as well as other figures) may be implemented by a respective combination of one or more processors and one or more computer storage devices, non-limiting examples of which are divulged herein.

The system disclosed herein monitors the performance of the predictions of every model deployed in the production environment. Its data lineage infrastructure 102 tracks all stages of the data transformation, from raw data to model features, from model features to trained models, and from trained models to models deployed in production. The self-healing system also correlates the life cycles of the transformed data, Raw data, feature data, model data, and data pipeline data are all correlated with each other. Leveraging that historical knowledge, the self-healing system detects the possible root causes for any model performance changes, and it proposes adequate actions to solve any detected issue.

Figure 2:
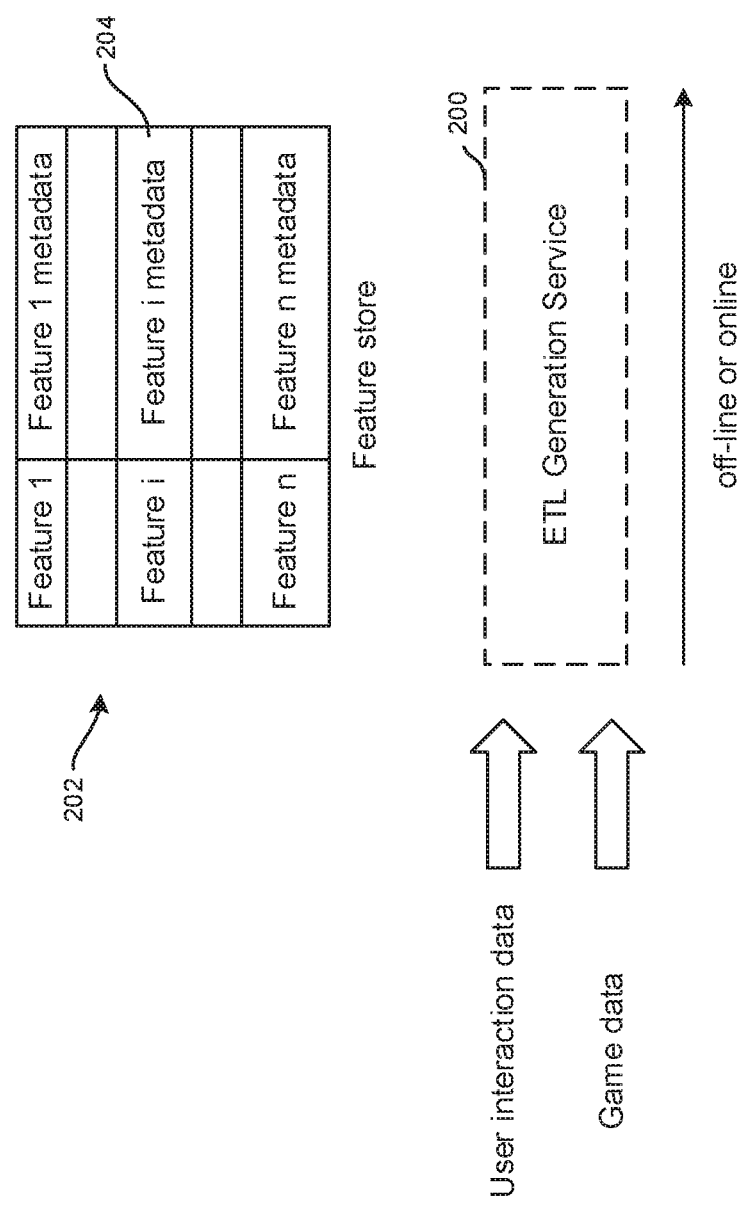
FIG. 2 is a schematic diagram illustrating data transformation for the features using a pipeline providing an off-line or online service to generate feature ETLs from user interactions and game data and storing feature meta-data in a feature store, in which features can be generated off-line from the data stored in a data lake or online when the data is streamed from a publish and subscribe feed.

Turning to FIG. 2, a machine learning pip 200 is shown that enables modelers to generate feature ETLs. Both user interaction and game data are received by an ETL generation service 200, described further herein. The ETL generation service 200 can generate one or more data structures 202 containing metadata 204 describing plural features. The feature metadata can include statistical metrics including mean, average, maximum, minimum, and standard deviation, relationships of the features with other features, and relationships of the features with models.

Figure 3:
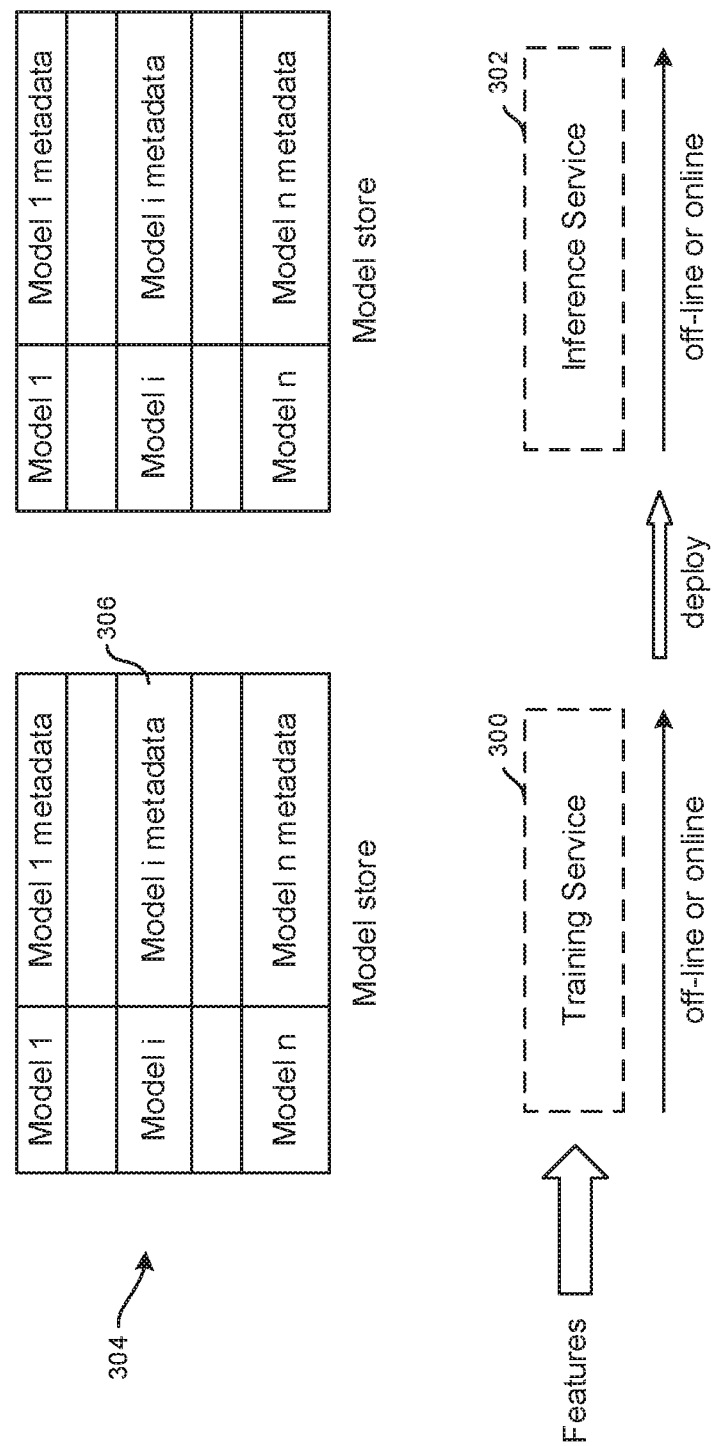
FIG. 3 is a schematic diagram of the data transformation for the models in which a pipeline provides a training service to train the model, and an inference service for the models to provide their predictions and in which model meta-data are stored in a model store.

As shown in FIG. 3, the pipeline also enables modelers to develop, train, and deploy machine learning models at scale. Features are input to a model training service 300 that may be off-line or online and after being trained, model can provide their prediction in an inference service 302. Both the training service 300, and the inference service 302 can generate one or more data structures 304 containing, for plural models, the model metadata 306 generated from both services.

The pipeline can be multi-tenant and can train a large number of models simultaneously. After being trained, models can provide their predictions simultaneously to many online or offline applications. For model training, the pipeline provides many off-the shelf standard machine learning libraries that implement multiple types of algorithms. For model inference, the model inference service 302 of the pipeline provides model deployment to multiple types of production environments.

The pipelines illustrated in FIGS. 2 and 3 generates the models and features metadata. The model metadata are generated when the model is trained, or when the model provides its predictions in inference. The feature meta-data may be generated after each ETL is generated in the pipeline.

The model metadata 306 can include, for each model, the model algorithm, the model architecture, in particular for deep learning models, such as convolutional neural networks (CNN) or recurrent neural networks (RNN), the model parameters or weights, the model hyperparameters, the model features, the model learning rate, the model dependencies to other models such as when the training or the prediction of a model is dependent on one or many other models, the state of the model prediction in inference as the model can provide online or off-line model inferences, and standard algorithm metrics. These metrics in turn may include, for a regression, root mean squared error and for a classification, precision, recall, F1 score (the harmonic mean of precision and recall). The metadata 306 also may include the relevancy of the model prediction for the recommendation as measured by, for example, the WPAE metric discussed herein.

The pipeline models provide to the game players personalized game experiences. Examples of those predictions include but are not limited to recommending a list of games just to a game player in his home page. Predictions also may include helping a game player to improve his play by recommending a tip such as watching a video to learn how to better play for a particular moment in the game. Moreover, predictions can include recommending a story about a game in the player news feed and recommending to the game player a game activity such as a particular event or tournament.

Figure 4:
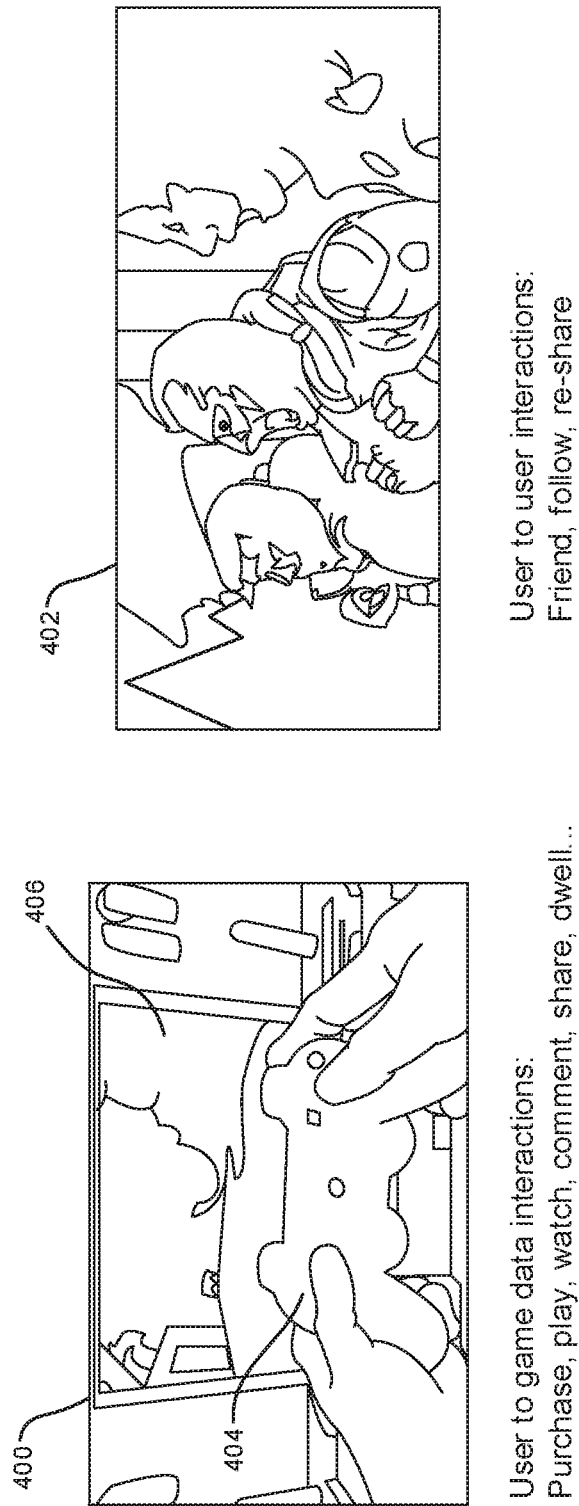
FIG. 4 are screen shots illustrating example non-limiting user interactions with items and user interactions with other users.

FIG. 4 uses first and second screen shots 400, 402 to illustrate the data lineage infrastructure 102 shown in FIG. 1 by illustrating example non-limiting user interactions with items and with the user interactions with other users. As shown in the screen shot 400, user-to-game data interactions are tracked which include user purchases of the game and items offered in the game, user play of the game, user watching the game, user comments pertaining to the game, user sharing of the game with other users, and user dwell time in the game. These interactions are recorded based on user input through, for example, a game controller 404 as the user watches the game on a display 406, with user input being recorded and correlated with game events in software to know what, precisely, user input on the controller 404 represents in the way of type of interaction.

The screen shot 402 on the other hand illustrates user-to-user interactions including user friending other users, following other users, and re-sharing computer simulation shares originally provided by sharing users. The decision tree and the sequence model of the self-healing system described further below leverage the data lineage infrastructure 102.

With the above in mind, it may be appreciated that the data lineage infrastructure 102 consistently tracks the direct raw game data and game player interaction data, and in particular tracks game data including game release date, age limit to play the game, game genre, game keywords/metadata, geography, and language of the game. Also tracked is user data including geography of the user, language of the user, age of the user, type of membership of the user, and electronic wallet balances of the user. User-to-game interactions are tracked including play commands, purchase orders, view of the game by the user, dwell time the user spent on an ad for a game, user like indications related to the game, user comments about the game, and user re-share of the game. Moreover, the data lineage pipeline. 102 tracks user-to-user interactions including friending, following, and re-sharing.

The above information is collected, e.g., by user game consoles/game controllers communicating inputs to one or more servers on the Internet and stored in a "data lake", or data repository typically hosted on storage devices on the Internet as indicated at block 108 of FIG. 1 discussed above. The data is used to generate off-line feature ETLs. Note that the user interactions can also be transmitted in real-time over a publish-and-subscribe feed as described in relation to block 110 of FIG. 1. In that case, the feature ETLs are generated online from those streamed interactions.

The data lineage infrastructure 102 consistently tracks the ancestry line responsible for generating the feature ETLs which are directly involved in training the models. It tracks the features generated by the ETLs themselves, their versions, their time contexts, the feature data distribution statistics, their dependencies with other ETLs, and their relationships with models. Historical feature meta-data is stored in a feature store as described in relation to block 112 of FIG. 1. The data lineage infrastructure 102 further consistently tracks the model performance metrics both during training and inference with a baseline model. It tracks the importance of each feature for each model, and when a model has dependencies with other models. Historical model meta-data is stored in a model store as described in relation to block 112 of FIG. 1.

Detection of an issue and remediation of that issue are done by two machine learning models: the decision tree model 104 shown in FIG. 1 and the sequence model 106 shown in FIG. 1, both by accessing information from the data lineage infrastructure 102.

Figure 5:
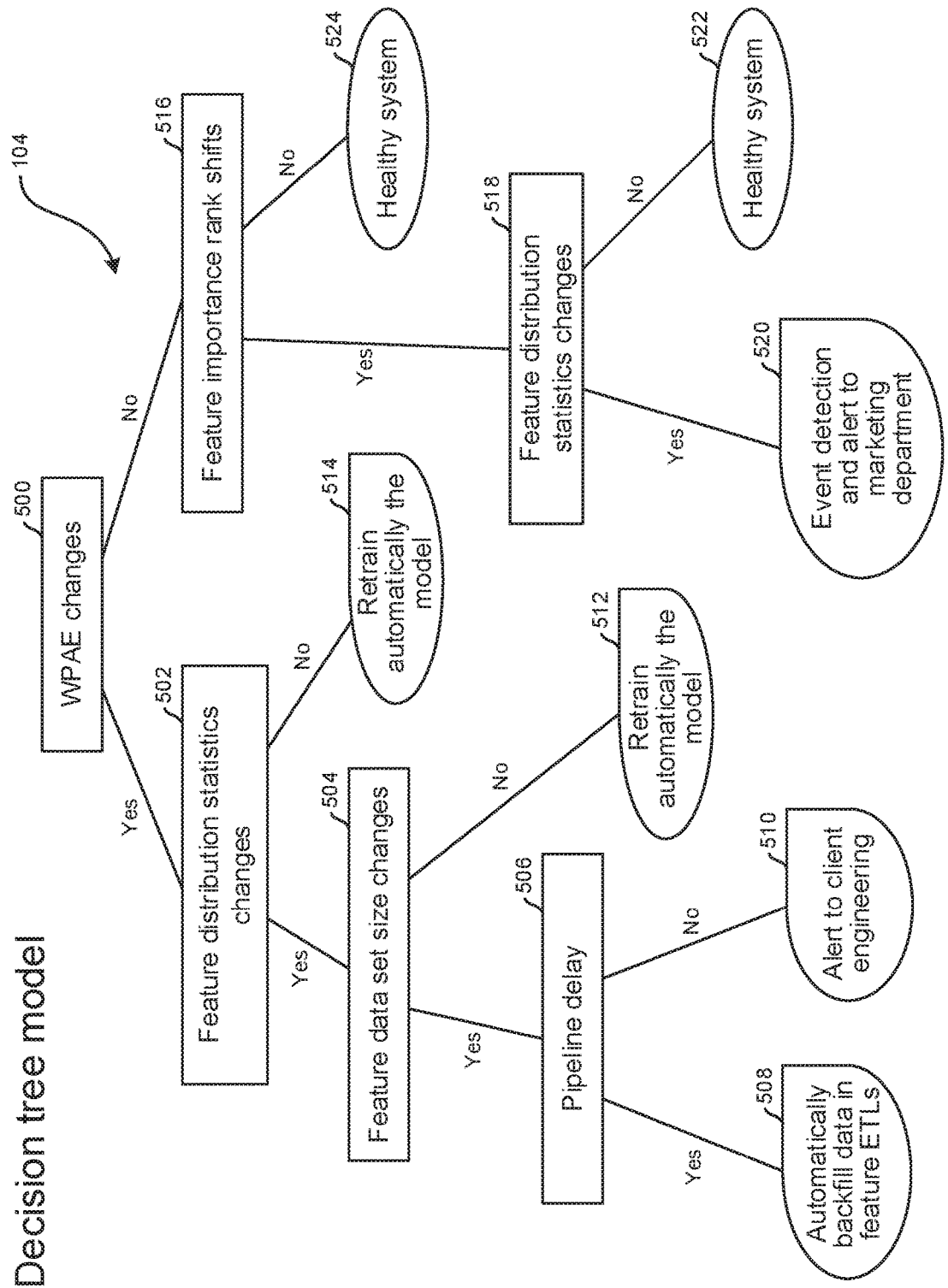
FIG. 5 shows an example of the decision tree model of FIG. 1 for classifying decisions by the self-healing system in various contexts.

FIG. 5 illustrates further details of the decision tree model 104. In general, by leveraging historical data from the data lake, feature store, and model store, the system can compare the life cycle of the transformed data for generating feature ETLs, training and deploying models with the life cycle of the user-to-game and user-to-user interactions. By combining the life cycle of features and models with the life cycle of user interactions to games or to other users, the self-healing system can discover the shifts in the user behaviors along with the shifts in the model predictions.

The decision tree model 104 tree can be trained with a Gini impurity measure:

$$G_i = 1 - \Sigma_{k=1}^{n} p_{I,k}^2$$

Where $p_{i,k}$ is the ratio of the class k among the training instances in the node.

The training algorithm can use the Classification and Regression Tree (CART) algorithm which minimizes the following cost function:

$$J(k, t_k) = \sim \frac{m \text{ left}}{n} G_{left} + \frac{m \text{ right}}{m} G_{right}$$

Where $G_{left/right}$ measures the impurity of the left/right subset, and $M_{left/right}$ is the number of instances in the left/right subset.

The goal of the decision tree model 104 is to classify the various actions that the self-healing system takes under certain conditions.

With the above in mind, as indicated at block 500, it is determined whether the model quality metric (e.g., the WPAE discussed above) changing by a given threshold defined by the data pipeline administrator such as for instance five percent (5%). If so, the model moves to block 502 to determine whether feature distribution statistics have changed. Thus, at block 502 the decision tree model analyzes the statistics about the feature distribution. As also will be explained further below, however, even if the model WPAE has not changed, the self-healing system requests the model to investigate if the system is from end-to-end healthy on a daily or weekly basis.

If the size of the raw data set for generating the feature ETL is determined to have changed at block 504 and if it is determined at block 506 that a pipeline delay exists, the logic moves to state 508 to automatically backfill raw data into the feature ETLs to compensate for the pipeline job processing delay.

On the other hand, if at block 506 it is determined that no pipeline delay exists in the presence of data set size changes as determined at block 504, the logic moves to state 510 to generate an audible or visual alert to the model engineering team developing a Web client for data collection consistent with principles herein. The client tele data might be missing and, in that case, a ticket to the client engineering team can be requested for that team to investigate the issue for the missing data.

In contrast, if at block 504 it is determined that the size of the raw data sets for generating the feature ETL has not changed, the logic moves to state 512 to trigger the model to be automatically re-trained.

Similarly, if it is determined at block 502 that feature distribution statistics have not changed by the threshold amount, the logic of the model may move to state 514 to trigger the model to be automatically re-trained in the presence of WPAE changes determined at block 500. Note that the actions at states 508, 510, 512, 514, and 520 are examples of "self-healing recommendations".

However, even if the model WPAE has not changed as determined at block 500, the model logic may move to block 516 to determine if feature importance ranking has shifted even when WPAE has not changed. This may be done to investigate if the system is from end-to-end healthy on a daily or weekly basis. Thus, at block 516 it may be determined whether the ranking of features by importance has changed. The self-healing system may trigger the model to be automatically re-trained. In addition, or alternatively, if the ranking in the importance of the features for the model has shifted as determined at block 516, the model logic may determine, at block 518, whether statistics regarding the distribution of features have changed. If the feature distribution statistics have changed the logic may move to state 520 to send an audible or visual request for modelers to investigate any change in the raw data distribution and alert the marketing department that user behaviors might have changed.

On the other hand, if it is determined at block 518 that the feature distribution statistics have not changed, the logic may move to state 522 to indicate that the overall system is healthy. Likewise, if it is determined at block 516 that the ranking of features by importance has not changed, the logic may move to state 524 to indicate that the overall system is healthy.

Figure 6:
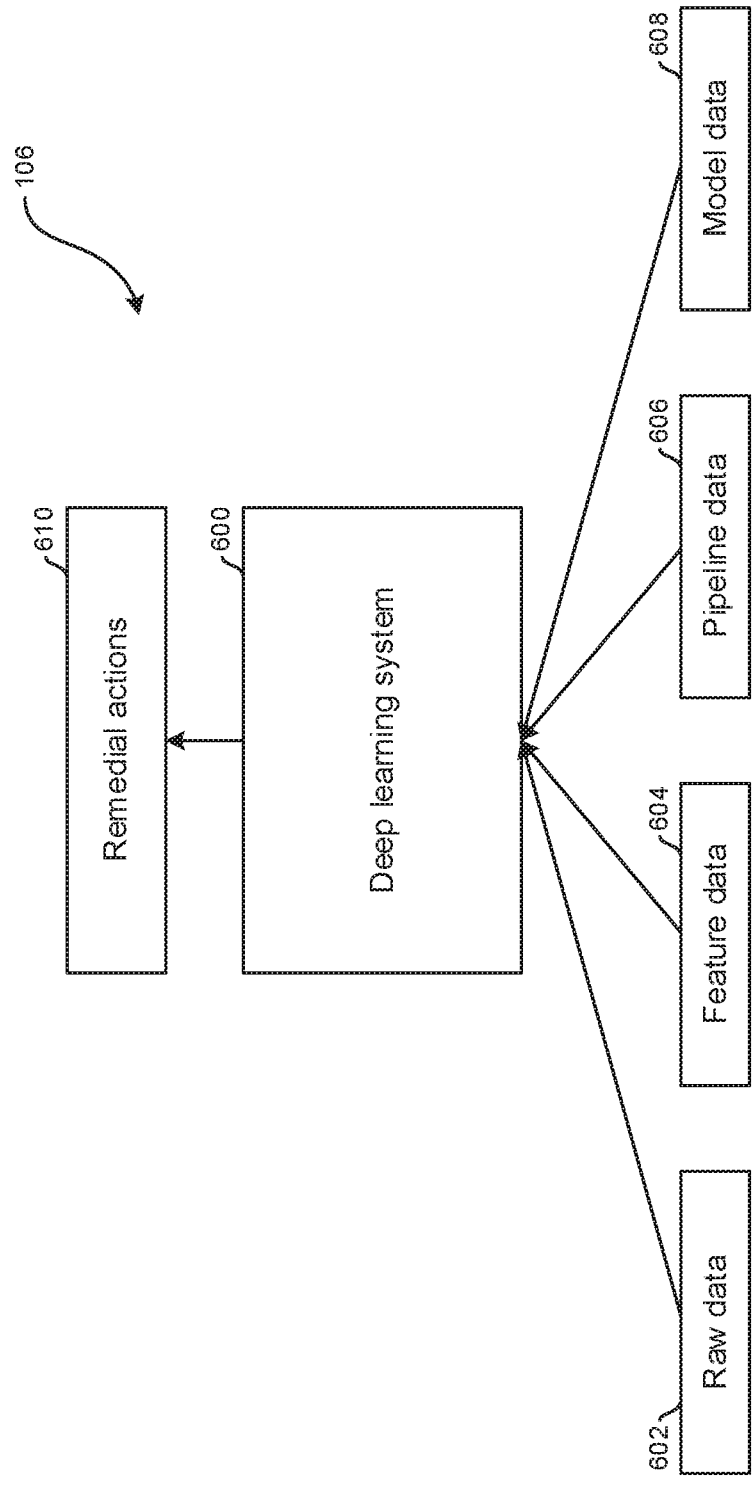
FIG. 6 is a block diagram of an example architecture of the sequence model of FIG. 1, including its deep learning system with its features and the output of the deep learning system that provides remedial actions.

FIG. 6 illustrates an example architecture for the sequence model 106. The sequence model 106 can be used by the self-healing system for off-line and online model predictions when sufficient historical data sets have been acquired. This might require up to 18 months of raw data.

As shown in FIG. 6, the sequence model 106 may be implemented with a deep learning system 600. The features input to the deep learning system 600 may include raw data distribution statistics 602. These statistics may include game data and user data distribution statistics and user-to-game and user-to-user interactions distribution statistics derived from the data lake of the data lineage infrastructure 102. The deep learning system 600 also may access feature data 604 including feature data distribution statistics, the importance of respective features in the model, and the status of feature deployment.

Additionally, the deep learning system 600 also may access pipeline monitoring data 606 including CPU/memory/instance usage by the machine learning pipeline, requests processed by the pipeline, and the time/duration/latency of the machine learning in the pipeline. The pipeline monitoring data 606 may further include error/warning in logging raw data and the number of machine learning jobs being executed.

The deep learning system 600 also may access model data 608. Model data may include model performance metrics measures by the model WPAE and model meta-data metrics.

The output of the deep learning system 600 includes recommended remedial actions 610 of the self-healing system.

The deep learning system 600 of the sequence model 106 may be implemented with a variation of recurrent neural networks (RNNs) called Long Short-Term Memory (LSTM) networks. RNNs are a class of neural networks that provide an effective and scalable model for making predictions based on sequential data. They combine the inputs from the present moment, as well as the inputs from the memory layer, to provide a decision.

As understood herein, however, when trained, RNNs may suffer from vanishing and exploding gradients. The reason why this happen is that RNNs cannot capture long term dependencies because of multiplicative gradients that can be exponentially decreasing or increasing with respect to the number of layers deployed in the RNN network.

Understanding that a goal of the self-healing system is to learn from large historical data sets to make a relevant prediction, LSTM networks address the problem of the vanishing and exploding gradients for RNNs by leveraging specific gates. LSTMs are very effective at capturing the long-term temporal dependencies of feature data.

Indeed, and now referring to FIG. 7, a LSTM unit 700 is shown that uses four types of gates as described in the table below:

| Type of gate | Role of the gate |
| --- | --- |
| Update gate (702) $\Gamma_u$ | How much past should matter now? |
| Relevance gate (704) $\Gamma_r$ | Drop previous information? |
| Forget gate (706) $\Gamma_f$ | Erase a cell or not? |
| Output gate (708) $\Gamma_o$ | How much to reveal of a cell? |

Figure 7:
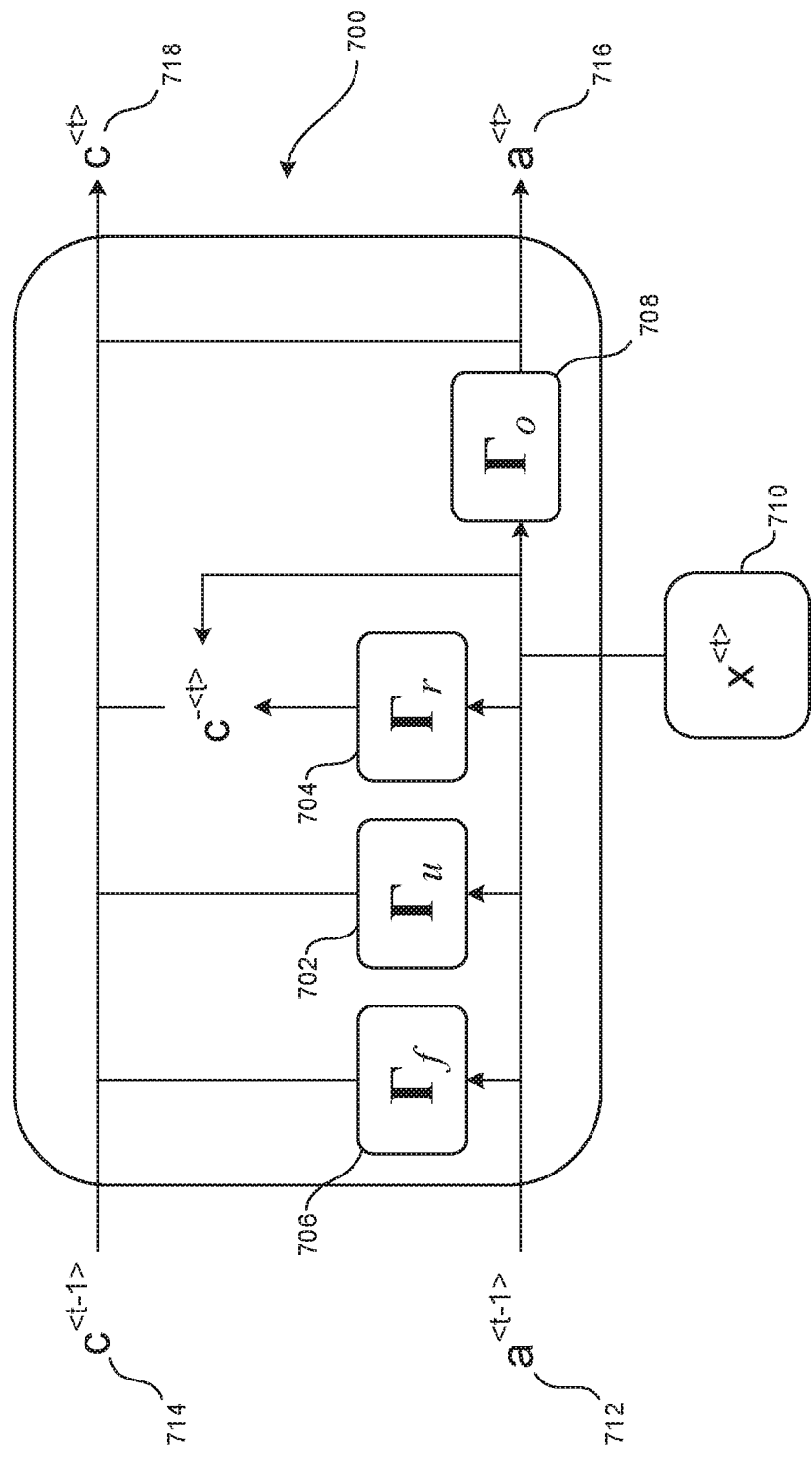
FIG. 7 is a schematic diagram of an architecture of a Long Short-Term Memory (LSTM) unit that may be implemented by the sequence model of FIG. 6.

FIG. 7 illustrates how those four gates are integrated into the LSTM unit, where:

$x^{<t>}$ 710 is the input vector to the unit, $a^{<t-1>}$ 712 is the previous cell output, $c^{<t-1>}$ 714 is the previous cell memory, $a^{<t>}$ 716 is the current cell output, and $c^{<t>}$ 718 is the current cell memory.

The current cell output 716 may be computed with the following formula where the sign * denotes the element-vise multiplication between two vectors:

$$a^{<t>} = \Gamma_o * c^{<t>}$$

The current cell memory 718 may be computed with the following formula:

$$c^{<t>} = \Gamma_u * \tilde{c}^{<t>} + \Gamma_f * c^{<t-1>}$$

Where $\tilde{c}^{<t>}$ may be calculated by the following expression:

$$\tilde{c}^{<t>} = \tanh(W_c[\Gamma_r * a^{<t-1>}, x^{<t>}] + b_c), \text{ where } W_c \text{ is the weight and } b_c \text{ the bias.}$$

Figure 8:
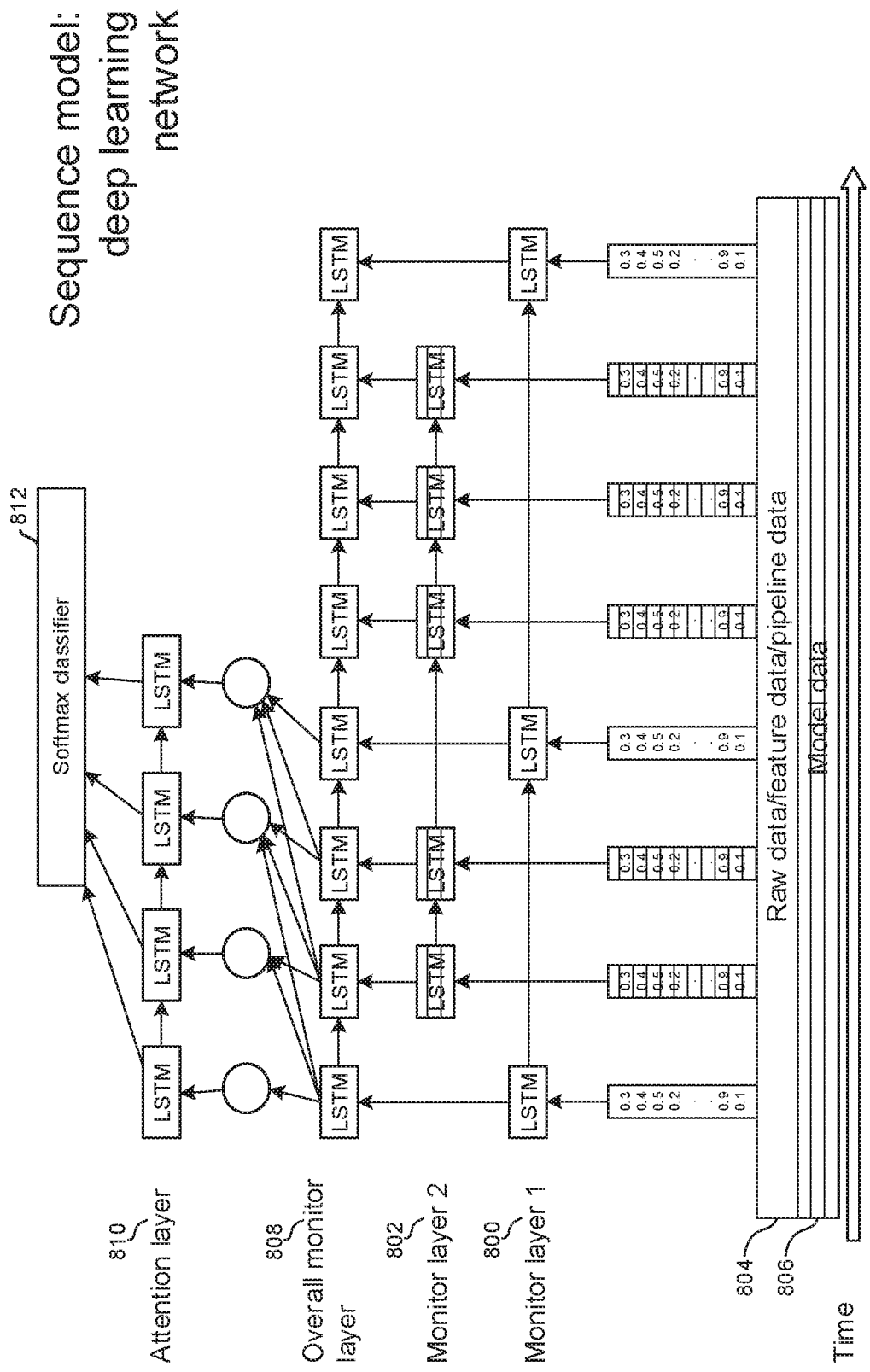
FIG. 8 is a schematic diagram of a more detailed architecture of the sequence model deep learning system, illustrating features of the system for the raw data; the feature data, the pipeline data, and the model data, three LSTM layer networks, and a related attention layer.

With the above structure of an LSTM in mind, attention is now drawn to FIG. 8, showing that in an example, the deep learning system 600 of the sequence model 106 includes three layers of LSTM units. The first two layers 800, 802 are monitoring layers that monitor the raw data, the feature data, the pipeline data 804, and the model data 806.

A third LSTM layer 808 provides an overall monitor for an attention layer 810. The attention layer 810 enables the deep learning system 600 of the sequence model 106 to learn where to pay "attention", and it can learn how to do so by adjusting the weights it assigns to its various inputs from the overall monitor layer 808.

As shown in FIG. 8, the attention layer 810 weights the output of the different LSTM cells in the overall monitor layer 808 and inputs its computed outputs to a softmax classifier 812, which outputs the probability for each possible action given by:

$$S(y_i^{(t)}) = \frac{e^{y_i(t)}}{\sum_j e^{y_i(t)}}$$

Related to the above, assuming $\alpha^{<t,t'>}$ is the amount of attention that the input to the classifier $y_i^{<t>}$ should pay to the activation $a^{<t'>}$ and $c^{<t>}$ the context at time t (with t progressing from left to right along the x-axis as shown) of the previous LSTM monitoring layer as determined by:

$$c^{(t)} = \sum_{t'} \alpha^{(t,t')} a^{(t')}$$

Figure 9:
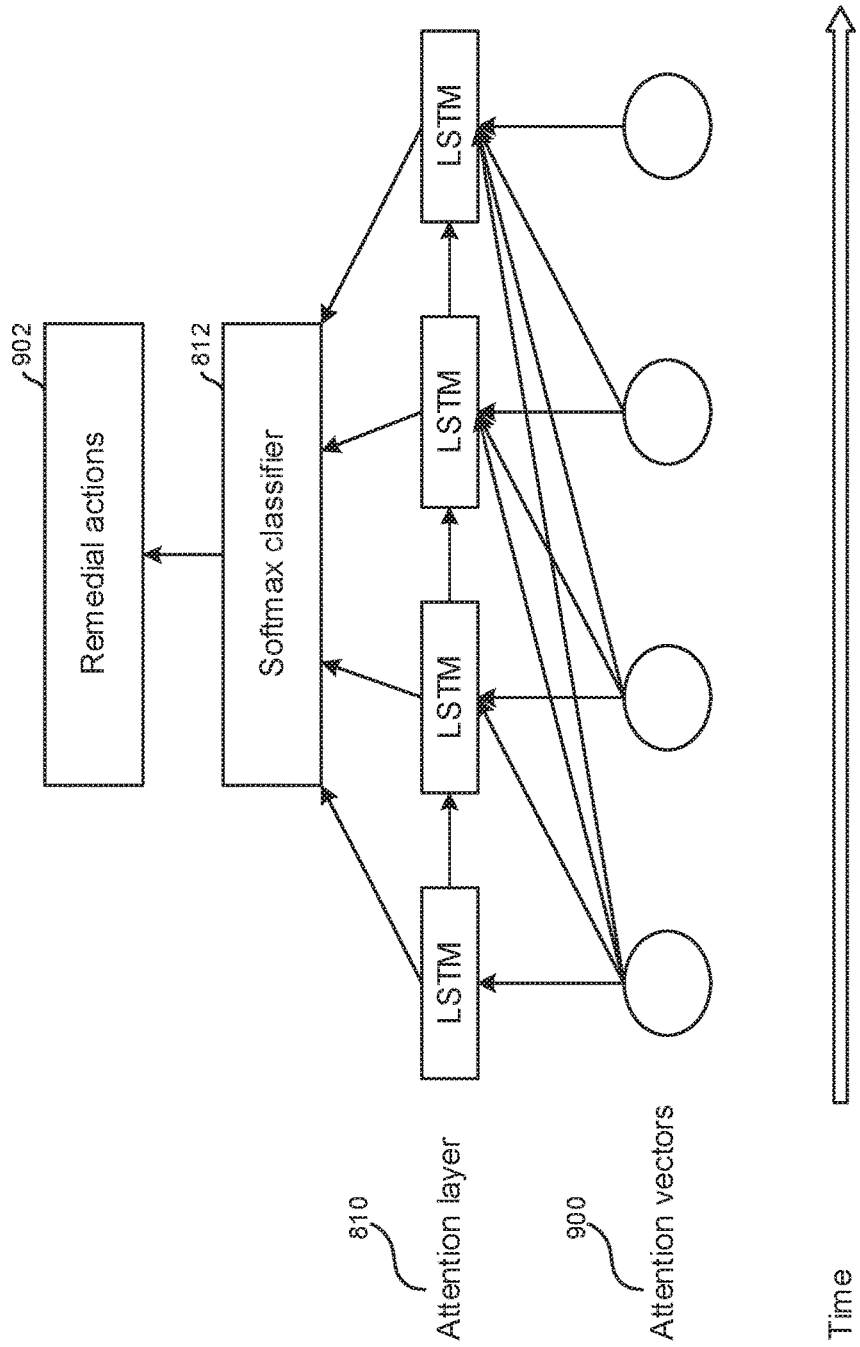
FIG. 9 is a schematic diagram of an example architecture of the attention layer shown in FIG. 8, including attention vectors that provide the inputs to the attention layer, the LSTM network of the attention layer, and the softmax classifier to classify the remedial actions.

We have $\alpha^{(t,t')} = \dfrac{e^{(t,t')}}{\sum_{t''=1}^{Tx} e^{(t,t')}}$ with $\sum_{t'} \alpha^{(t,t')} = 1$ FIG. 9 illustrates that the LSTM units of the attention layer 810 leverage the attention vectors 900 and provide input to the softmax classifier 812 as described above, which outputs remedial actions 902. For an off-line model, the inputs to the sequence model may include daily model WPAE and model meta-data metrics, daily feature distribution statistics, daily raw data distribution; and pipeline monitoring data. The remedial actions 902 output by an off-line sequence model 106 can include the highest probability, generated by the softmax classifier 812 of the sequence model, of one or more of the following actions:

healthy system—no action from the self-healing system;
retrain models—the self-healing system will automatically retrain the model;
develop new models—the self-healing system alerts the modeler that a new model might be needed;
create new features—the self-healing system alerts the modeler that new features need to be generated for the model;
backfill job data on missing data—the self-healing system automatically backfills raw data into the feature ETLs; and
user event detection—the self-healing system requests investigation of any change in the raw data distribution and alert the marketing department that user behaviors might have changed.

On the other hand, for an online sequence model 106, the inputs to the sequence model may include hourly model performance such as the number of clicks on an item, or the number of purchases by the game player. online model meta-data metrics, feature deployment status indicating that all features are available to the model in order for the model to returns its predictions, and online feature meta-data metrics. The output (remedial actions 902) of an online sequence model 106 may include the highest probability, generated by the softmax classifier 812 of the sequence model, one or more of the following actions:

heathy system—no action from the self-healing system;
revert deployed models—the self-healing system re-deploys, in production; the default model; update the online features—the self-healing system requests the modeler to change the features in the model; and
user event detection—the self-healing system requests investigation of any change in the raw data distribution and alert the marketing department that user behaviors might have changed.

Figure 10:
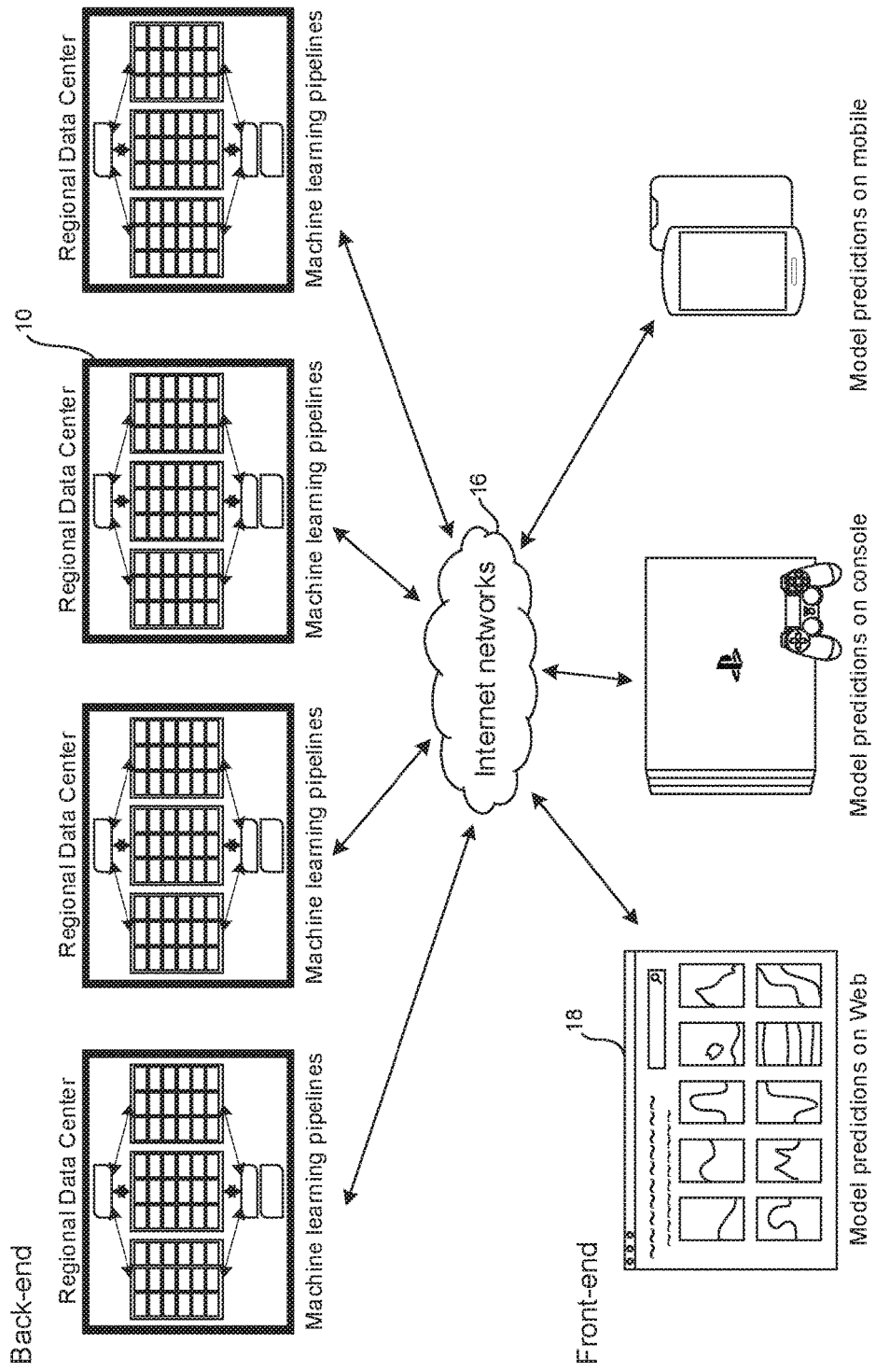
FIG. 10 is a block diagram of a network architecture of a cloud-based machine learning platform consistent with present principles.

Now referring to FIG. 10, an example system is shown, which may include one or more of the example devices mentioned herein in accordance with present principles to execute techniques described in this document. As shown, a system may include one or more regional data centers 10 each of which includes one or more servers with attendant processors and solid-state memories and disk memories. The servers establish a cloud-based system for executing the above-described machine learning platform in which machine learning models are executed on multiple data centers. The regional data centers communicate via wired and/or wireless links 16 with one or more computerized front-end devices 18 such as a computer (laptop, PC, etc.) executing a Web browser, a mobile application executing on a mobile device, or a computer simulation console such as a game console.

Thus, as shown in FIG. 10, the machine learning pipelines for personalizing game experiences are provided from the "cloud". The machine learning pipelines execute over a large number of computer clusters in the cloud back-end hosted by the regional data centers 10. All model training and model inferences happen in the backend. The model predictions are provided to a front-end application such as any of the front-end applications running on the devices 18 including a Web browser, a game console, or a mobile application. All front-end applications communicate to the cloud back-end over Internet networks 16. Each cluster might include a large number of computer servers located physically on one or multiple server farms located into one or multiple data centers that are geographically distributed.

A typical architecture may include a large number of regional data centers distributed over the world with one or multiple regional data centers located in North America, Europe Middle East and Africa, Japan, and the rest of the world.

Figure 11:
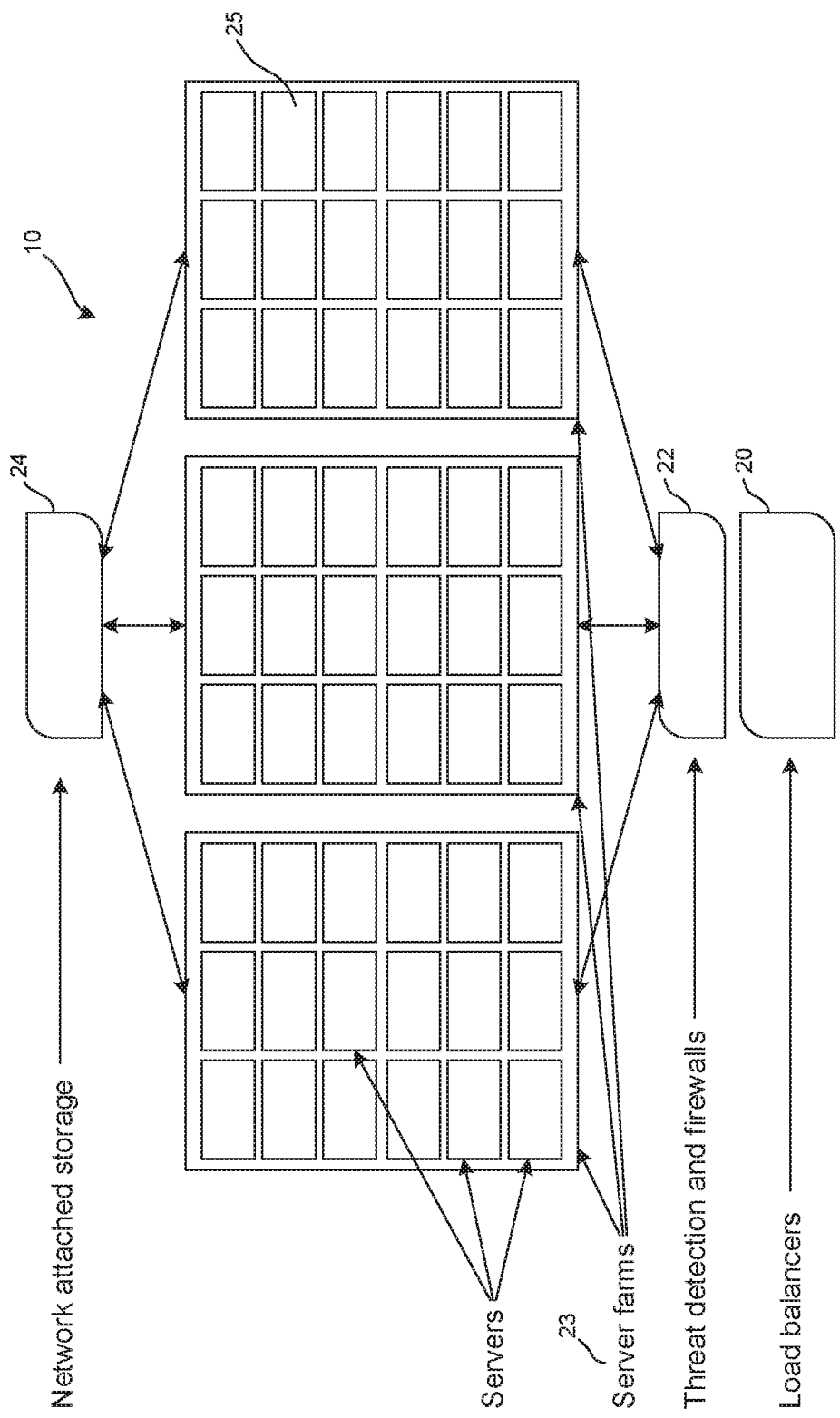
FIG. 11 is a block diagram of a data center architecture consistent with present principles.

As shown in FIG. 11, each data center may include one or multiple load balancers 20 to manage the network requests from the front-end applications 18 and to plural server farms 23 and one or multiple threat detection and firewall appliances 22 to protect servers 25 from external security threats. Although most of the data is in motion and generated and may be stored in large file systems such as the Apache Hadoop Distributed File System (HDFS) in various data formats such as Apache Parquet that can easily be accessed and manipulated by the clusters in the server farms, some data might be at rest and stored physically on network attached storage devices (NAS) 24 in the data center.

A computerized front end device 18 may include one or more displays, one or more speakers for outputting audio in accordance with present principles, one or more input devices, one or more network interfaces, one or more input ports such as, e.g., a high definition multimedia interface (HDMI) port or a USB port to physically connect (e.g. using a wired connection) to another CE device and/or a headphone port to connect headphones, one or more computer memories such as disk-based or solid-state storage, position or location receivers one or more cameras, etc.

It will be appreciated that whilst present principals have been described with reference to some example embodiments, these are not intended to be limiting, and that various alternative arrangements may be used to implement the subject matter claimed herein.

What is claimed is:

1. An apparatus, comprising:
   at least one processor; and
   at least one computer storage that is not a transitory signal and that comprises instructions executable by the at least one processor to:
   execute a computer-implemented decision tree model having access to historical data, model features, and model metadata to identify changes in behaviors of users of computer simulations and changes in predictions of models to recommend to users at least in part by:
   determining, for at least a first prediction model, whether a change is associated with a model quality metric associated with the first prediction model;
   responsive to determining that a change is associated with the model quality metric associated with the first prediction model, generating a signal to cause the computer-implemented decision tree model or a sequence model to identify causes of the change using feature distribution statistics;
   responsive to determining that a change is not associated with the model quality metric associated with the first prediction model, generating a signal to initiate a system health check comprising determining whether a ranking of features by importance has changed;
   responsive to determining that the ranking of features by importance has changed, determining whether statistics regarding a distribution of features have changed;
   responsive to determining that statistics regarding a distribution of features have changed, generating a signal indicating that user behaviors might have changed;
   responsive to determining that statistics regarding a distribution of features have not changed, indicating a healthy system;
   responsive to determining that the ranking of features by importance has not changed, indicating a healthy system; and
   responsive to the signal indicating that user behaviors might have changed, execute at least one of the following:
   retrain at least one model,
   develop at least one new model,
   create at least one new feature for at least one model,
   input data to at least one feature service,
   generate an alert that user behaviors might have changed,
   re-deploy in production at least one default model,
   change at least one feature of at least one model.

2. The apparatus of claim 1, wherein the instructions are executable to:
   identify that an attribute of a data set for generating an indicia of model features has changed and in response automatically backfill data into the indicia of model features to compensate for processing delay;
   identify that an attribute of a data set for generating the indicia of model features has not changed and in response re-train the first prediction model.

3. The apparatus of claim 1, wherein the sequence model comprises:
   a deep learning system;
   raw data distribution statistics for input to the deep learning system;
   feature data including feature data distribution statistics, importance of respective features in the model, and status of feature deployment for input to the deep learning system;
   monitoring data including computer component usage, requests processed, and temporal characteristics of machine learning for input to the deep learning system; and
   model data including model performance metrics measures and model meta-data metrics for input to the deep learning system;
   the deep learning system outputting recommendations of remedial actions for a machine learning pipeline.

4. The apparatus of claim 3, wherein the deep learning system comprises:
- at least a first layer of long short-term memory (LSTM) units for monitoring raw data, feature data, and pipeline data from a data lineage infrastructure;
- at least a second layer of LSTMs for monitoring model data;
- at least a third layer of LSTMs for providing an overall monitor of the two previous layers to an attention layer;
- the attention layer which adjusts its weights assigned to the inputs from the previous overall monitor; and
- a softmax classifier for receiving input from the attention layer and outputting respective probabilities for plural actions.

5. The apparatus of claim 4, wherein at least a first one of the probabilities is given by:

$$S(y_i^{(t)}) = \frac{e^{y_i(t)}}{\sum_j e^{y_i(t)}}$$

wherein $\alpha^{<t,t'>}$ is an amount of attention that input to a classifier $y_i^{<t>}$ should pay to the activation $a^{<t'>}$ and $c^{<t>}$ at time t of a previous monitoring layer as determined by:

$$c^{(t)} = \sum_{t'} \alpha^{(t,t')} a^{(t')}$$

then $\alpha^{(t,t')} = \dfrac{e^{(t,t')}}{\sum_{t''=1}^{Tx} e^{(t,t')}}$ then $\sum_{t'} \alpha^{(t,t')} = 1$, wherein $c^{<t>}$=current cell memory, t' is a time, and T is an upper time limit.

6. The apparatus of claim 4, wherein the sequence model is off-line, and inputs to the sequence model include daily model effectiveness metric, model meta-data metrics, daily feature distribution statistics, daily raw data distribution, and pipeline monitoring data.

7. The apparatus of claim 6, wherein the sequence model is configured to output a highest probability generated by the softmax classifier of one or more of no action, automatically retrain at least one model, develop at least one new model, create at least one new feature, add data, and indicate change in user behavior.

8. The apparatus of claim 4, wherein the sequence model is online, and inputs to the sequence model include one or more of hourly model performance, online model meta-data metrics, feature deployment status indicating that all features are available to the model, and online feature meta-data metrics.

9. The apparatus of claim 8, wherein the sequence model is configured to output a highest probability generated by the softmax classifier of one or more of no action, re-deploy a default model, request a change to model features, and indicate change in user behavior.

10. The apparatus of claim 1, wherein the instructions are executable to:
- track changes in quality of model predictions indicating performance of respective computer simulation models;
- responsive to identifying a first amount of data, invoke the computer-implemented decision tree model to identify changes in behaviors of users of computer simulations and changes in predictions of models to recommend to users; and
- responsive to a second amount of data different from the first amount of data, invoke the computer-implemented sequence model to identify changes in behaviors of users of computer simulations and changes in predictions of models to recommend to users.

11. The apparatus of claim 1, wherein the instructions are executable to:
- responsive to the signal indicating that user behaviors might have changed, retrain at least one model.

12. The apparatus of claim 1, wherein the instructions are executable to:
- responsive to the signal indicating that user behaviors might have changed, develop at least one new model.

13. The apparatus of claim 1, wherein the instructions are executable to:
- responsive to the signal indicating that user behaviors might have changed, create at least one new feature for at least one model.

14. The apparatus of claim 1, wherein the instructions are executable to:
- responsive to the signal indicating that user behaviors might have changed, input data to at least one feature service.

15. The apparatus of claim 1, wherein the instructions are executable to:
- responsive to the signal indicating that user behaviors might have changed, generate an alert that user behaviors might have changed.

16. The apparatus of claim 1, wherein the instructions are executable to:
- responsive to the signal indicating that user behaviors might have changed, re-deploy in production at least one default model.

17. The apparatus of claim 1, wherein the instructions are executable to:
- responsive to the signal indicating that user behaviors might have changed, change at least one feature of at least one model.

* * * * *